G. B. KIRKHAM.
Treadles.
No. 5,385. Reissued April 29, 1873.
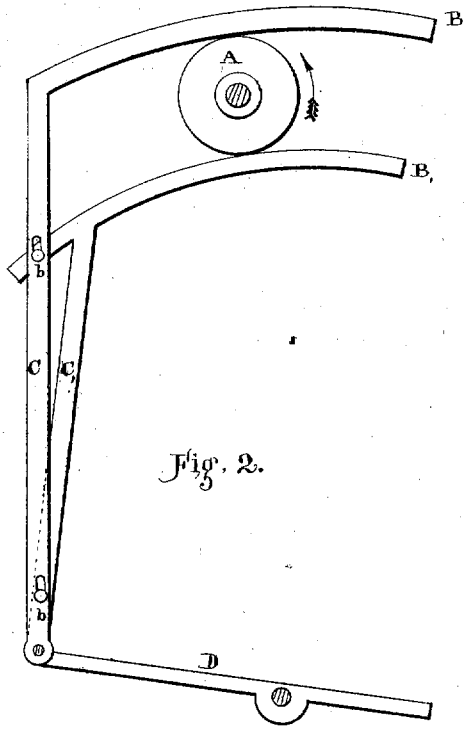
Fig. 2.
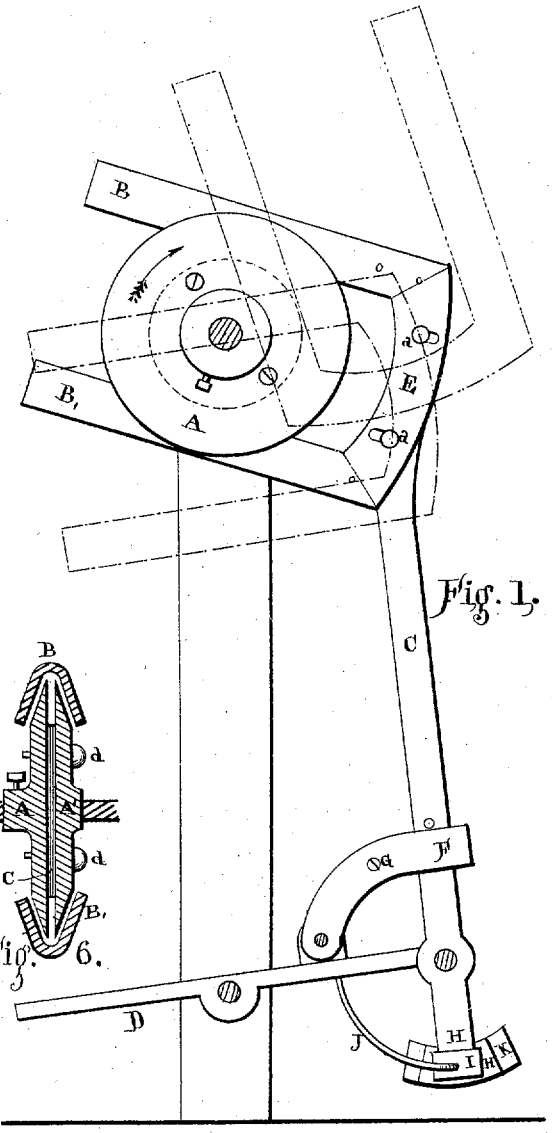
Fig. 1.
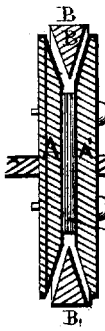
Fig. 3.
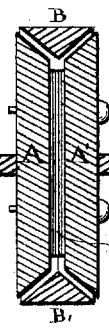
Fig. 4.
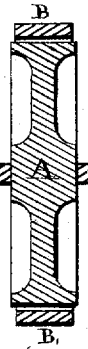
Fig. 5.
Fig. 6.
Witnesses.
A L Walson
H M Pain
Inventor.
George Byron Kirkham.
AM. PHOTO-LITHOGRAPHIC CO. N.Y. (OSBORNE'S PROCESS.)

UNITED STATES PATENT OFFICE.

GEORGE B. KIRKHAM, OF NEW YORK, N. Y.

IMPROVEMENT IN TREADLES.

Specification forming part of Letters Patent No. 136,603, dated March 11, 1873; reissue No. 5,385, dated April 29, 1873; application filed April 3, 1873.

*To all whom it may concern:*

Be it known that I, GEORGE BYRON KIRKHAM, of No. 167 East Thirty-third street, New York city, county and State of New York, have invented an Improvement in Treadles or Foot-Powers, of which the following is a specification:

The object of this invention is to provide a foot-power which is applicable to sewing-machines, jig-saws, hand-lathes, and the like, which will always turn the fly-wheel in the right direction with a noiseless and positive motion.

Figure 1 is a general view of the invention, showing the various angles at which the bearings-arms can be placed. Fig. 2 shows a modification, with double pitman and curved arms. Fig. 3 is an end view of the fly-wheel beveled arms. Fig. 4 is an end view of a shallow grooved wheel and beveled arms. Fig. 5 is an end view of a flat wheel and arms. Fig. 6 is an end view of a beveled wheel and grooved arms.

Part of this improvement in treadles is anticipated in a previous patent of mine, December 5, 1871; but in that patent I represented the bearing-arms as being always vertical in a line with the pitman, and with a great deal of shifting apparatus; but I have since found by experiment that it is better to put the bearing-arms at an angle to the pitman, and to attach the shifting apparatus, when required, to the treadle and pitman in the shape of friction-clutches F F and H I K, Fig. 1; also, I have made various modifications in the bevels and grooves of the arms and wheels.

In Fig. 1, A is the fly-wheel of the machine; B B, the bearing-arms; C, the pitman; and D, the treadle. The beveled arms B B′ and their body E can be set by *a a* at any angle with the pitman from vertical to a right angle, as indicated by the dotted lines; but the angle represented in black lines is about the best in practice.

When the treadle D and pitman C are raised the arm B′ catches in the groove of the fly-wheel A and runs from B′ to E, causing the wheel to revolve in the direction of the arrow, When the treadle and pitman are lowered the upper arm B strikes in the groove of A and runs from E to B, continuing the revolution of A in the same direction. These bearing-arms B B′ may be either rigid or of a flexible material; but if of the latter they must be tightly stretched by screws, or by any suitable means.

To keep the pitman C steady, and in order that it may offer some resistance to the backward-and-forward motion caused by A B B′, I have attached to it and the treadle various friction-clutches, F F and H I K. These can be used together or separately, as they may be needed. At some angles of the bearing-arms to the pitman these friction-clutches may be dispensed with, the *vis inertia* of B B′ C being sufficient to effect the purpose. In operation they act as a shifting apparatus, and increase the traction of the arms B B′ against A. F F are two friction-clutches, hinged to the treadle and pressing on either side of the pitman. Their pressure against the sides of the pitman is regulated by the screw and circular spring G. H is a prolongation of the pitman C, K a prolongation of the treadle, and I a slide pressed against H by the spring J. I and K, being on either side of H, produce considerable friction, which is what is requisite to steady the pitman.

When it is necessary to have a very uniform motion to the wheel A the arms B B′ must be curved somewhat, as shown in Fig. 2; also, there can be used the double pitman C C′ in the place of the body E to hold the arms B B′. As the arms B B′ or wheel A wear by constant use, there would soon result a disagreeable rattling noise. To prevent this and keep the arms B B′ always snug to the wheel A set-screws *b b* are used to bring the arms B B′ nearer together when necessary.

In Fig. 3 is shown the wheel A with a deep groove and beveled arms B B′. Between the two halves of A are placed several disks, *c c*, of pasteboard, leather, or other suitable material. By unscrewing *d d* and taking out one of the disks *c* the two halves of the wheel A A′ can be brought closer together, and thus take up any wear in the arms B B′ or wheel A A′.

In Fig. 4 is shown a shallow groove and broad bevel.

In Fig. 5 both the arms B B′ and wheel A are flat where they bear against each other. Their surfaces could also be curved either way; but it is not necessary to represent this.

In Fig. 6 the wheel A is beveled and the arms B B′ are grooved. Any degree of bevel or groove can be used—from the sharpest acute angle to a curved or flat surface—in the arms B B′ and wheel A A′; but it is sufficient to indicate a few of the modifications.

In my invention I claim—

1. The arrangement of the bearing-arms B B′ at an angle to the pitman C and the set-screws *a a*, substantially as and for the purpose hereinafter set forth.

2. The combination of friction-clutches F F G and H I J K with the pitman and treadle, substantially as and for the purpose hereinbefore set forth.

3. The arrangement of the curved arms B B′, set-screws *b b*, and double pitman C C′, substantially as and for the purpose hereinbefore set forth.

4. The arrangement of the two halves of the wheel A A′, disks *c c*, screws *d d* with grooves, bevels, curved or flat surfaces to the arms B B′ and wheel A A′, substantially as and for purpose hereinbefore set forth.

GEORGE BYRON KIRKHAM.

Witnesses:
A. L. WATSON,
H. M. PAIN.